(12) United States Patent
Frost et al.

(10) Patent No.: US 8,107,407 B2
(45) Date of Patent: Jan. 31, 2012

(54) EHSPA ARCHITECTURE

(75) Inventors: Tim Frost, Bristol (GB); David Fox, Reading (GB); Gavin Wong, Walton on Thames (GB)

(73) Assignee: Vodafone Group PLC, Newbury, Berkshire (GB)

( * ) Notice: Subject to any disclaimer, the term of this patent is extended or adjusted under 35 U.S.C. 154(b) by 543 days.

(21) Appl. No.: 12/225,203

(22) PCT Filed: Mar. 16, 2007

(86) PCT No.: PCT/GB2007/000936
§ 371 (c)(1),
(2), (4) Date: Mar. 16, 2009

(87) PCT Pub. No.: WO2007/107715
PCT Pub. Date: Sep. 27, 2007

(65) Prior Publication Data
US 2009/0180417 A1    Jul. 16, 2009

(30) Foreign Application Priority Data

Mar. 17, 2006 (GB) .................................. 0605465.4
Nov. 3, 2006 (GB) .................................. 0621969.5
Mar. 2, 2007 (GB) .................................. 0704100.7

(51) Int. Cl.
*H04H 20/71* (2008.01)
*H04W 4/00* (2009.01)
*H04L 12/28* (2006.01)
*H04L 12/56* (2006.01)
(52) U.S. Cl. ......... 370/312; 370/328; 370/390; 370/392
(58) Field of Classification Search .................. 370/312, 370/328, 389, 390, 392
See application file for complete search history.

(56) References Cited

U.S. PATENT DOCUMENTS
2005/0002395 A1 * 1/2005 Kondo .......................... 370/390
(Continued)

FOREIGN PATENT DOCUMENTS
WO    WO 2005/015776 A1    2/2005

OTHER PUBLICATIONS

"3rd Generation Partnership Project; Technical Specification Group Services and System Aspects; Multimedia Broadcast/Multicast Service (MBMS); Architecture and functional Description (Release 6)" 3GPP TS 23.246 V6.9.0 (Dec. 2005) Technical Specification, [Online] Dec. 15, 2005, pp. 1-47, XP002437568, Retrieved from the internet: URL: http://www.3gpp.org/ftp/Specs/html-info/23246. htm> [retrieved on Jun. 12, 2007].

(Continued)

*Primary Examiner* — Ronald Abelson
(74) *Attorney, Agent, or Firm* — Muirhead and Saturnelli, LLC

(57) ABSTRACT

A system and method for use in a telecommunications network may utilize Multimedia Broadcast Multicast Services (MBMS), specifically, a Universal Mobile Telecommunications System (UMTS) or a Long Term Evolution (LTE) network may utilize MBMS and eHSPA technology. IP multicast connections directly between the eHSPA Node Bs and an IP address are utilized to reduce the amount of transport bearers that need to be established. Further, the RNC functionality for setting up an MBMS communication is divided between the eHSPA Node Bs and a legacy RNC, utilized as a CRNC. In particular, this arrangement enables the user plane to be effectively established from the enhanced node B, whilst still allowing the second RNC to have control of the control plane decisions. This therefore also allows the resources used in establishing the MBMS communication to be minimized.

25 Claims, 11 Drawing Sheets

U.S. PATENT DOCUMENTS

2005/0151840 A1* 7/2005 Hurtta ............................ 348/61

OTHER PUBLICATIONS

"3rd Generation Partnership Project; Technical Specification Group Radio Access Network Requirements for Evolved UTRA (E-UTRA) and Evolved UTRAN (E-UTRAN) (Release 7)" 3GPP TR 25.913 V7.2.0 (Dec. 2005) Technical Specification, [Online] Dec. 22, 2005, XP002437569, Retrieved from the internet: URL: http://www.3gpp.org/ftp/Specs/html-info/25913.htm> [retrieved on Jun. 12, 2007].

"3rd Generation Partnership Project; Technical Specification Group Radio Access Network; Introduction of the Multimedia Broadcast Multicast Service (MBMS) in the Radio Access Network (RAN); Stage 2 (Release 6)" 3GPP TS 25346 V6.7.0 (Dec. 2005) Technical Specification, [Online] Dec. 23, 2005, XP002437570, Retrieved from the internet: URL: http://www.3gpp.org/ftp/Specs/html-info/25346.htm> [retrieved on Jun. 12, 2007].

* cited by examiner

EHSPA ARCHITECTURE

TECHNICAL FIELD

This application relates to a system and method for use in a telecommunications network utilising Multimedia Broadcast Multicast Services (MBMS), and, more particularly, to a Universal Mobile Telecommunications System (UMTS) or a Long Term Evolution (LTE) network utilising MBMS and eHSPA technology.

BACKGROUND

Since its introduction, third-generation (3G) cellular technology has provided the ability to deliver more voice channels and higher-bandwidths to user equipment/terminals (UEs) such as mobile handsets. In reality, however, while most 3G networks allowed for higher-quality voice services, the same did not apply to data speed.

In this regard High-Speed Packet Access (HSPA) was developed. HSPA is a protocol that provides a transitional platform for UMTS-based 3G networks to offer higher data transfer speeds, and so bridges the gap between 3G networks and the Internet. HSPA is made up of High Speed Downlink Packet Access (HSDPA) and High Speed Uplink Packet Access (HSUPA).

HSDPA provides impressive enhancements over WCDMA, including shorter connection and response times. More importantly, HSDPA offers three- to five-fold throughput increase, which translates into significantly more data users on a single frequency or carrier. The substantial increase in data rate and throughput is achieved by implementing a fast and complex channel control mechanism based upon short physical layer frames, Adaptive Modulation and Coding (AMC), fast Hybrid-ARQ (Automatic Repeat-reQuest) and fast scheduling. The exact implementation of HSDPA is known, and so will not be described further here.

HSPA can be implemented as an upgrade to and in co-existence with deployed UMTS/WCDMA networks. The cost of deploying HSPA chiefly lies in base station and Radio Network Controller (RNC) software/hardware upgrades. Most base stations (also known as Node Bs) will need upgrades to cope with the increased data throughput and the consequences of moving to a more complex protocol.

Advancements have also been made to HSPA since its introduction, and the improved version has been termed evolved HSPA (eHSPA). In this regard, an eHSPA Node B/Enhanced Node B has been proposed, which, in addition to its Node B functionally, includes RNC functionality. This enhanced Node B enables user terminals to use 3GPP Release 5 and later Release air interfaces with no modifications for HSPA traffic.

The RNC functionality is provided alongside the standard Node B functionality within the base station/eHSPA Node B. With this architecture the call set up delay can be reduced, as there is minimal latency associated with the communications between the RNC functionality and the Node B functionality, since they are physically in close association.

It has also been proposed to use Node Bs (namely eNode Bs) similar to eHSPA Node Bs in the Long Term Evolution (LTE) network, which is a 4G technology, currently in development.

It is to be appreciated that the eHSPA Node B architecture has been designed so as to handle packet switched data communications more efficiently, as the RNC within the eHSPA Node B is able to communicate directly with the Packet Switched (PS) Component of the Core Network. While this architecture and use of eHSPA improves efficiency for PS communications, it is also imperative that the architecture is compatible with other services, such as Multimedia Broadcast and Multicast Services (MBMS).

MBMS is an IP-based technology designed to more efficiently deliver multimedia (video, audio, and text) content over 3G radio and network resources. For Universal Mobile Telecommunications Systems (UMTS) it is a feasible platform for the delivery of multimedia services, as it allows many users to receive the same service simultaneously.

Before MBMS, multimedia content had to be delivered as IP packets via unicast transmission, where each individual user consumed network resources to download content, such as music or ring tones, and the resources were uniquely provided to that individual. MBMS now makes it possible to transmit data only once in each cell, and all interested users in the cell can share the cost of the radio resources consumed. This can be achieved either by broadcast, where all users receive the service, or by multicast, where only a selected set of users receive the service. Multicast is typically used to target users that have explicitly subscribed to a service.

Applications for MBMS include multimedia streaming and file downloads. Further, a multicast service received by a User Equipment/Terminal (UE) may consist of a single ongoing session (e.g. a multimedia stream) or may involve several intermittent multicast sessions over an extended period of time (e.g. messages). An example of a service using the multicast mode could be a football results service for which a subscription is required.

The MBMS service has two transmission modes, namely Point-to-Point transmission (PTP) and Point-to-Multipoint transmission (PTM). In PTM, one common channel is used for all UEs in a cell, and in PTP, a separate channel is used for each UE.

While the eHSPA Node B can be incorporated into an LTE or a UMTS system, the standard MBMS procedure does not provide a practical compatibility with eHSPA. This is because in the current MBMS procedure, the "Session Start" message, which establishes the network resources needed for the MBMS data transfer, needs to be routed directly between the SGSN and all of the RNCs that it can connect towards. Therefore, in view of each eHSPA Node B incorporating a Radio Network Controller (RNC), this means that transport bearers are now also required to extend from the SGSN to each eHSPA Node B. This is undesirable, as it means more transport resources are required. It would greatly increase the traffic load on the Iu interface, and is also likely to cause a lot of problems for SGSN processor dimensioning and Iu-PS transport dimensioning. Therefore, in fact MBMS technology and eHSPA technology are completely at odds with each other.

SUMMARY OF THE INVENTION

According to the system described herein, in a telecommunications network, including an enhanced node B having a first radio network controller (RNC), the enhanced node B configured to communicate with user terminals, the telecommunications network further including a second RNC configured to communicate with the enhanced node B and also to communicate with the core network, a method of establishing a Multimedia Broadcast Multicast Service (MBMS) communication may include establishing an IP Multicast connection directly between an IP address and at least one of the enhanced Node B and the second RNC in order to provide the MBMS communication.

In this way, IP multicast can be utilised to reduce the amount of transport bearers that need to be established.

According further to the system described herein, in a telecommunications network, including an enhanced node B having a first radio network controller (RNC), the enhanced node B configured to communicate with user terminals, the telecommunications network further including a second RNC configured to communicate with the enhanced node B, a method of establishing a Multimedia Broadcast Multicast Service (MBMS) communication may include the first RNC performing a first portion of the RNC functionality for establishing the MBMS communication; and the second RNC performing a second portion of the RNC functionality for establishing the MBMS communication.

The first portion of the RNC functionality may include establishing an IP Multicast connection directly between the enhanced Node B and an IP address. The second portion of the RNC functionality may include determining whether the enhanced Node B is to provide the MBMS communication via a PTP connection or a PTM connection, and notifying the enhanced Node B of that determination.

In this way, the RNC functionality is divided between the two RNCs, such that the user plane can be effectively established from the enhanced node B, whilst still allowing the second RNC to have control of the control plane decisions. This therefore allows the resources used in establishing the MBMS communication to be minimised.

The enhanced Node B is an eHSPA Node B and the second RNC may be a legacy RNC.

According further to the system described herein, a mobile telecommunication network may include a central IP multicast controller, a plurality of telecommunications devices registered with the mobile telecommunications network, means for associating a plurality of said devices in a group and means for routing MBMS data to the group of devices via said central IP multicast controller.

DETAILED DESCRIPTION

Figure 1:
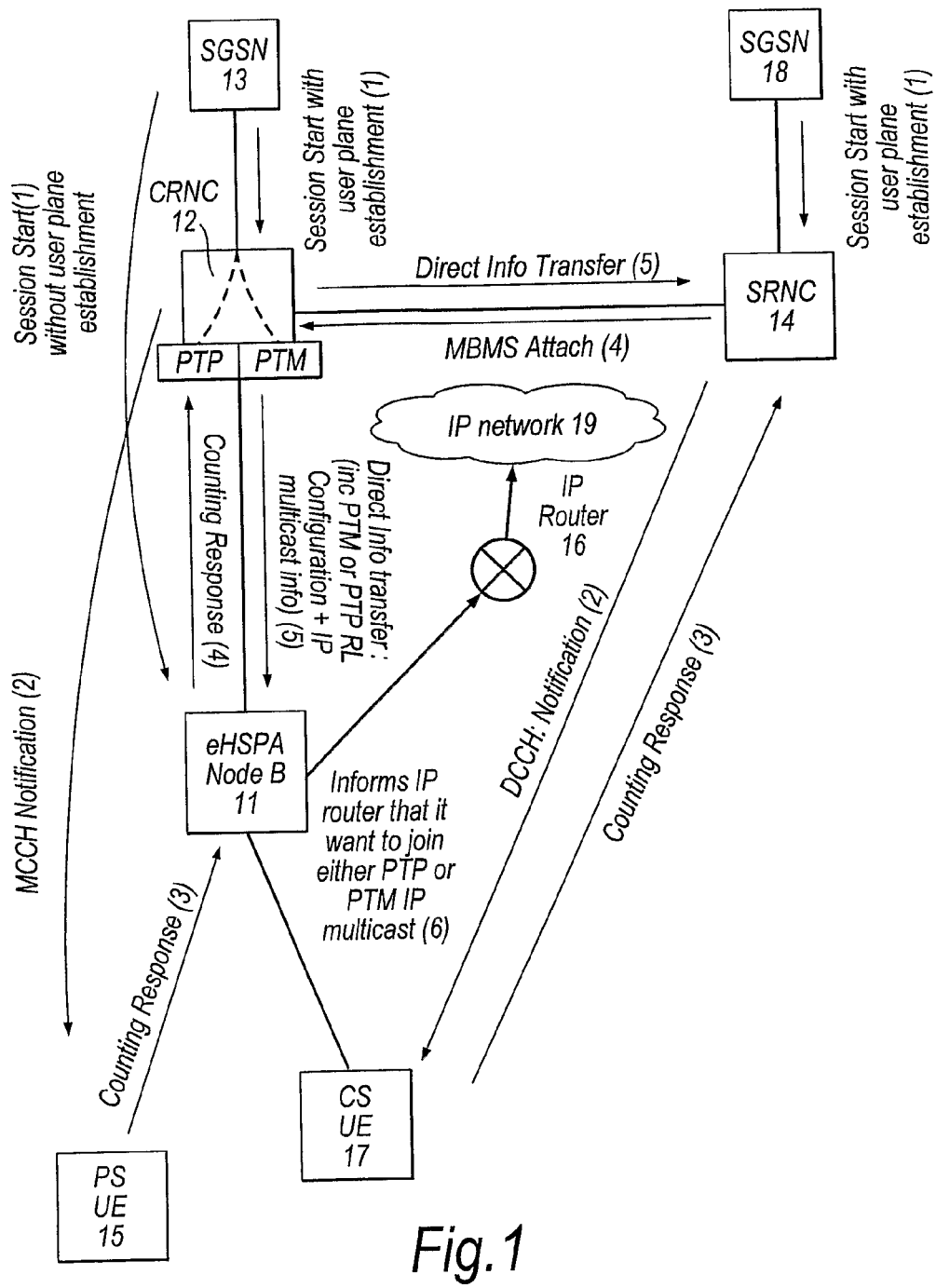
FIG. 1 illustrates an MBMS procedure according to a first embodiment of the invention.

With reference to FIG. 1, the MBMS procedure according to a first embodiment of the invention will now be described. This procedure uses an CRNC-based IP multicast to provide data streams to the eHSPA Node Bs directly. The network according to this first embodiment includes an eHSPA Node B 11, which incorporates an RNC. The network may be an LTE network or a UTRAN network, although this embodiment will be described in relation to a UTRAN network and its components.

In this example, the eHSPA Node B 11 has an established packet switched (PS) connection with user terminal 15, and so its internal RNC is a Serving RNC, and is in communication with a Serving GPRS Support Node (SGSN) 13 from the packet switched (PS) component of the core network. The SGSN 13 in turn communicates with a Gateway GPRS Support Node (GGSN) (not shown) which is in turn connected to a Broadcast Multicast Service Centre (BM-SC) (not shown). The BM-SC provides access to the content sources, such as the Internet.

The EHSPA Node B 11 is also in communication with a second RNC 12, being an RNC from the legacy UTRAN network. This second RNC 12 is also in communication with the SGSN 13. In FIG. 1, the UTRAN RNC 12 is also in communication with other RNCs of the UTRAN network, such as RNC 14, via the Iur interface. In this example RNC 14 is a Serving RNC, as it has an established Circuit Switched (CS) voice connection with user terminal 17.

Figure 11:
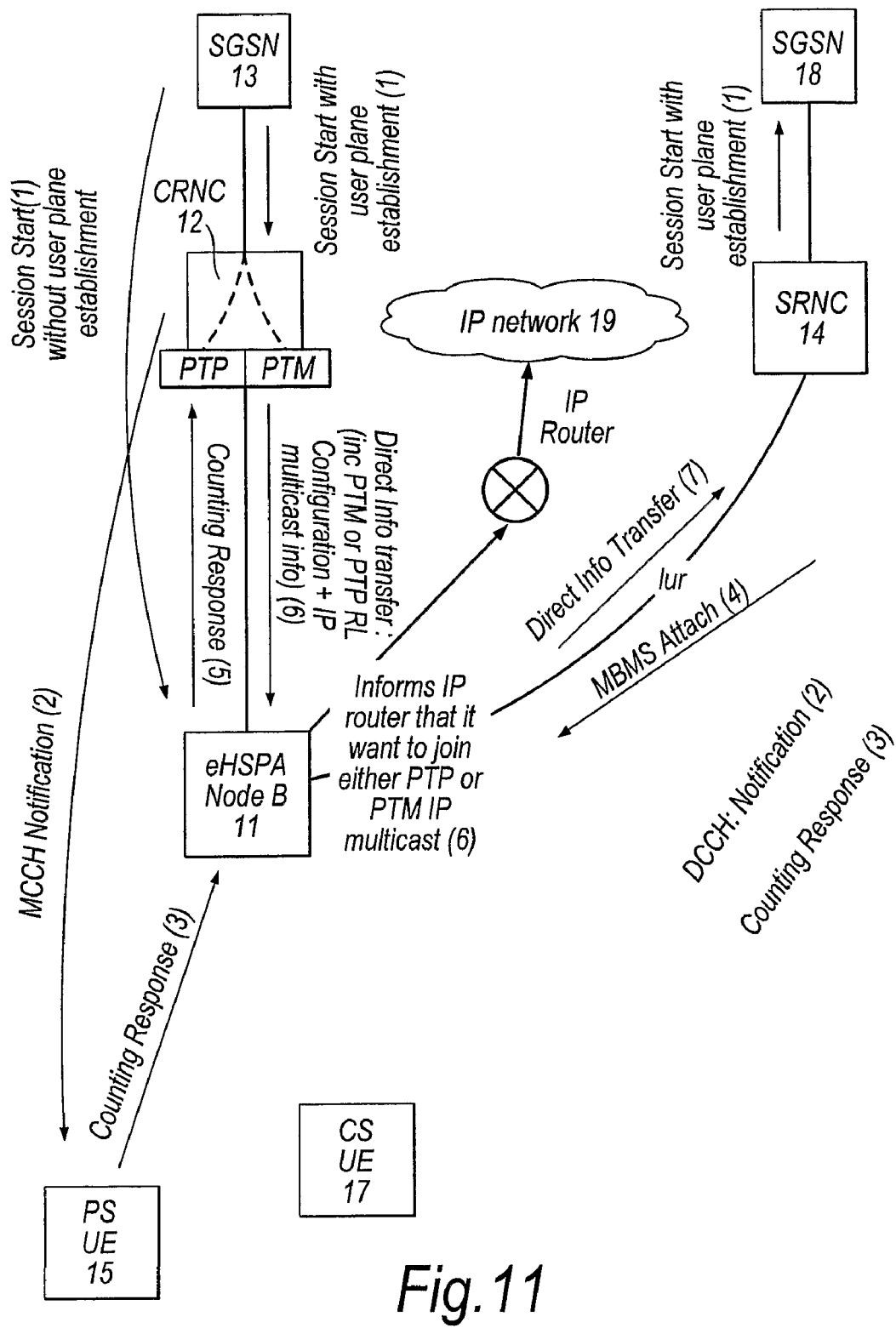
FIG. 11 illustrates an MBMS procedure according to a further embodiment of the invention.

It is also possible, such as is shown in FIG. 11, for the eHSPA Node B 11 to be in direct communication with other RNCs such as legacy RNC 14 via the Iur interface. In this example, RNC 14 is shown as an SRNC, but the CRNC 12 is still used for MBMS purposes.

It is to be appreciated that in order for a user terminal to be eligible to receive multicast services from an operator, the user terminal may first start a relationship with the operator by taking out a subscription. This subscription can be for a specific MBMS service, such as a news service, or football score updates or generally to be notified of any service as it becomes available.

Then, when a UE is active or idle in a network, the UE may register with the MBMS provider in order to receive notification of when an MBMS service becomes available. In this regard, when an RNC detects that it is hosting a UE interested in a MBMS bearer service, the RNC sends an MBMS Registration Request to its parent SGSN. If the SGSN has no MBMS Bearer Context for the MBMS bearer service, the SGSN sends an MBMS registration request to its parent GGSN. If the GGSN has no MBMS Bearer Context, it sends a registration request to the BM-SC (Broadcast/Multicast Service Centre). When the BM-SC receives the request, if the MBMS Bearer Context is active, the BM-SC initiates the "Session Start" procedure. Otherwise it adds the GGSN ID to its list of downstream nodes in its MBMS Bearer Context and provides a response, which includes information on the MBMS bearer service, such as its TMGI (Temporary Mobile Group Identity) and required bearer capabilities. Once the GGSN receives the response, it in turn adds the SGSN to its list of downstream nodes in its MBMS Bearer Context and forwards the response to the SGSN. This is perpetuated down the chain to the RNC. In this way, MBMS Registration is a procedure by which a downstream node informs an upstream node that it would like to receive session data for a particular MBMS bearer service in order to distribute it further downstream. This results in the set up of an MBMS bearer context, but it does not result in the establishment of a bearer plane, which may be done by the Session Start procedure.

The MBMS procedure of this embodiment of the invention will be described in regard to the situation of the service provider offering a news multicast to its subscribers.

When the service provider wishes to make the news multicast available to its subscribers, the BM-SC (not shown) may be configured to send a "Session Start" message to all of the nodes in the network.

More typically, however, the BM-SC sends a "Session Start" message to all of the GGSNs recorded in its list of downstream nodes for this bearer service. The GGSNs in turn send the "Session Start" message to all the SGSNs recorded in its list of downstream nodes, which in this instance includes SGSN 13 and SGSN 18. SGSN 13 in turn sends the "Session Start" message to all RNCs recorded in its list of downstream nodes, which includes the second RNC 12, which has the role as the Controlling RNC (CRNC), and the SRNC of the evolved Node B 11. SGSN 18 sends the "Session Start" message to SRNC 14 of the legacy UTRAN.

Figure 3:
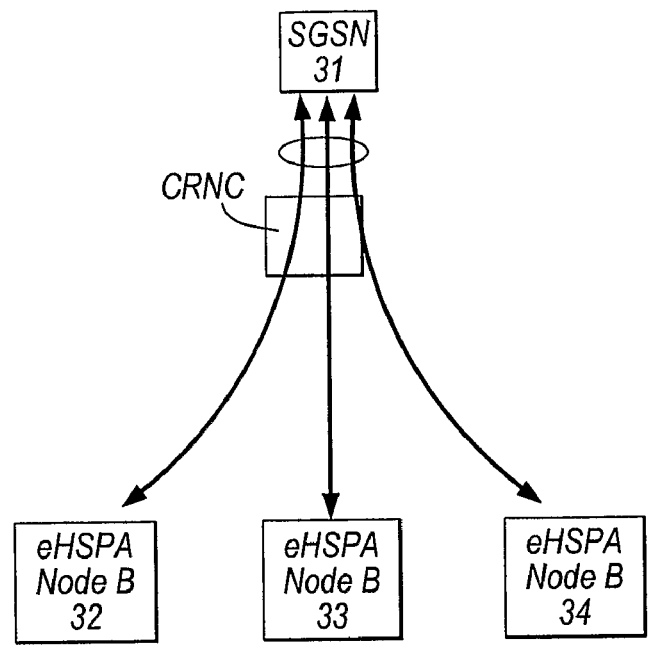
FIG. 3 illustrates the user planes that would be necessary if established from the SGSN to all of the RNCs of the eHSPA Node B's in the network.

According to known MBMS methods, at this stage a user plane would be established between the SGSNs and each of the RNCs to be involved in the multicast. If this were to be applied to the architecture of FIG. 1, an example user plane topology is shown in FIG. 3. In FIG. 3 separate user planes extend from the SGSN 31 to each of the eHSPA Node Bs 32, 33 and 34. This is not a desirable approach due to the large usage of resources that would be required.

Instead, a user plane could be established between the SGSN 13 and the CRNC 12, as well as between the SGSN 18 and each of the legacy RNCs 14 that receive the "Session Start" message.

However, according to this embodiment of the invention, the user planes for the eHSPA Node Bs are to be established via IP multicast, and so the user plane will not actually be provided via the SGSN. In particular it is to be appreciated that at this point in time, a user plane is not established to the eHSPA Node Bs 11. The Session Start message therefore includes an IP address for PTP and an IP address for PTM, which may be the same or different.

Upon receiving the "Session Start" message, the CRNC 12 notifies user terminals in the vicinity that a news multicast is about to commence, by sending out an MBMS Service Notification. This MBMS Service Notification is sent via the MBMS Control Channel (MCCH), which is a logical channel used for sending notifications to the air interface. The MBMS Service Notification is usually termed an "MCCH Notification", and effectively notifies the user terminals that a multicast session is about to start, if they would like to receive it.

If a user terminal (UE) would like to receive the news multicast, the UE transmits a message indicating such. This message indicates the service of interest to the UE and can be an "RRC Connection Request" or a "Cell Update" message, and would be received by the nearest Node B, or the Node B to which a connection is already established. Referring to FIG. 1, in the case of user terminal 15, a PS connection has already been established with the eHSPA Node B 11, and so it is the eHSPA Node B which receives the UE's request for the service. This stage in the procedure is generally called the "Counting" phase.

From the perspective of a standard UTRAN, UE 17 sends its service request via a UTRAN Node B (not shown) to SRNC 14, with which a voice connection is already established. The UTRAN SRNC 14 would then indicate the UE interest to the Controlling RNC (CRNC) such that it may then make a decision on PTM or PTP based on counting the total number of "UE interest" indications that it receives.

As an alternative, it is also possible for the CRNC for such a UE to be in the eHSPA Node B, in which case the UE will include the UE interest indication as part of its "counting information" that it passes to the CRNC 12 that handles the MBMS control. This alternative arrangement is illustrated in FIG. 11. FIG. 11 has an Iur interface between the eHSPA Node B 11 and SRNC 14, rather than between CRNC 12 and the SRNC 14, as per the FIG. 1 example.

Again referring to the FIG. 1 embodiment of the invention, when the eHSPA Node B 11 receives the service requests from the UEs, it passes the messages to its internal RNC, which becomes the SRNC for the news multicast that is about to commence. The evolved Node B's SRNC then proceeds to count the number of responses. In this way, usage of network resources is minimised, as there is no need to forward the service requests to the external CRNC 12 for counting. In other words, the efficiency of the procedure is optimised by dividing away this counting functionality from the tasks performed by the CRNC 12.

Once the number of users has been counted by the eHSPA node B 11, it communicates this information to the CRNC 12 in an NBAP message across the Iub interface. In addition to receiving the counting message via NBAP from the eHSPA Node B 11, the CRNC will receive a corresponding message from SRNC 14, in the form of an "MBMS Attach" message. This "MBMS Attach" message indicates the users SRNC 14 has counted as being interested in the service in its cell.

Alternatively, if there is a direct connection from the eHSPA Node B 11 to SRNC 14 via Iur, as per the FIG. 11 embodiment, then SRNC 14 will instead provide its indication of user interest via MBMS Attach to the eHSPA Node B 11, rather than directly to the CRNC 12. The eHSPA Node B will then also include this response in its count of responses to be sent to CRNC 12. In this alternative arrangement, the MBMS Attach procedure now applies across the Iur interface between the SRNC 14 and the eHSPA Node B 11, whose internal RNC is acting as the CRNC for the SRNC 14.

When CRNC 12 has received the count from all of its associated SRNCs, be they legacy SRNCs or SRNCs in eHSPA Node B's, or SRNCs with a direct connection to the eHSPA node B 11, as per FIG. 11, it processes this information and establishes the network resources needed for the multicast data transfer to take place. This is generally established based upon the number of UEs that wish to take part in the multicast and their locations.

Therefore, based upon the number of interested user terminals per Node B, the CRNC makes a decision as to whether a common channel can be used for all UEs in a cell taking part in the multicast (i.e PTM), or whether a separate channel for each UE is required (i.e. PTP).

With this decision made, the CRNC 12 will then provide a "Direct Information Transfer" message to the each directly-connected SRNC (e.g. SRNC 14 in FIG. 1) or eHSPA Node B (e.g. eHSPA Node B 11 in FIGS. 1 and 11) that has responded. In the FIG. 11 embodiment, this message will be relayed by the eHSPA Node B to any SRNC that has a direct connection to the eHSPA Node B.

This "Direct Information Transfer" message provides the channel type information (i.e. PTP or PTM), and in the case of PTM, the frequency layer on which the service will be transmitted. Also in this message there will be an "IP Multicast Address", corresponding to the address that will be delivering the service. This multicast address will depend on whether the CRNC has selected PTP or PTM and may be a multicast from the core network itself (i.e. from the BM-SC/SGSN) or an IP network. As an alternative, however, the eHSPA Node B may receive the PTP and/or PTM Multicast addresses from the SGSN, such as in the Session Start message.

Figure 4:
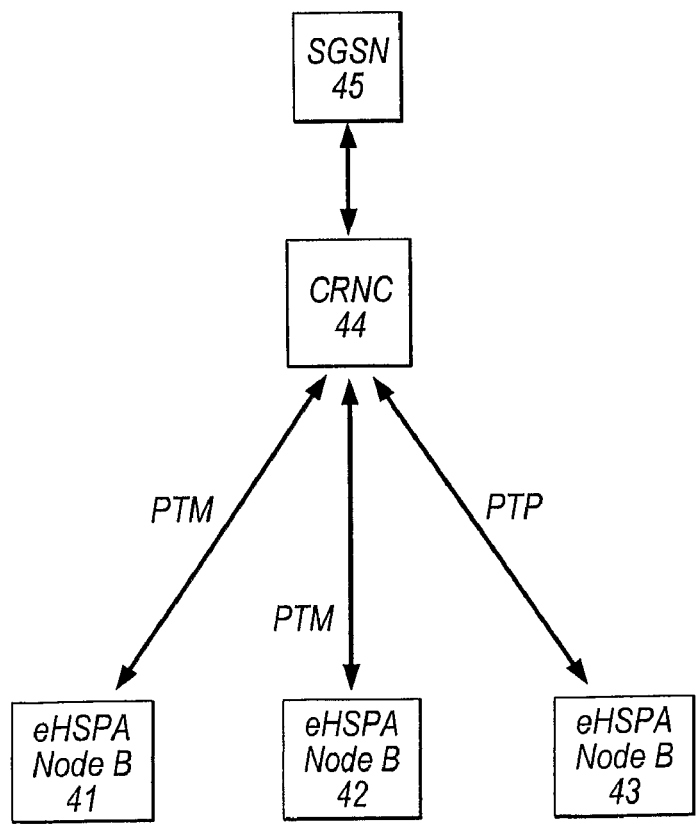
FIG. 4 illustrates an example of the user plane layout, once a multicast service has been established for the first embodiment of the invention.

In this regard, FIG. 4 shows an example topology, where the CRNC has selected the PTM group for eHSPA Node Bs 41 and 42, while the PTP group has been selected for eHSPA Node B 43. Separate messages are transmitted to each eHSPA Node B with the relevant information.

Again referring to FIG. 1, upon receiving this "Direct Information Transfer" message, the eHSPA Node B 11 will then contact its nearest IP router 16 to request to join the relevant PTP or PTM multicast service, using the IP Multicast Address.

To establish the user plane for eHSPA Node B 11 using IP multicast, once the eHSPA Node B 11 informs the IP Router 16 that it would like to join the PTP/PTM group (as appropriate), the eHSPA node 11 receives the Iu frame protocol data from the IP multicast server of the IP network 19, via the IP Router 16. The eHSPA Node B 11 provides the data to the user terminal 16 on the Dedicated Traffic Channel (DTCH). In this way, the eHSPA/enhanced Node Bs are responsible for establishing the user plane to the UEs for MBMS services, and the user plane established will be based on the IP multicast group ID that each are provided with (i.e. whether the decision is PTP or PTM). The user plane from the IP multicast server id established directly, with the packets having the same protocol structure as that coming from the Iub directly.

Figure 5:
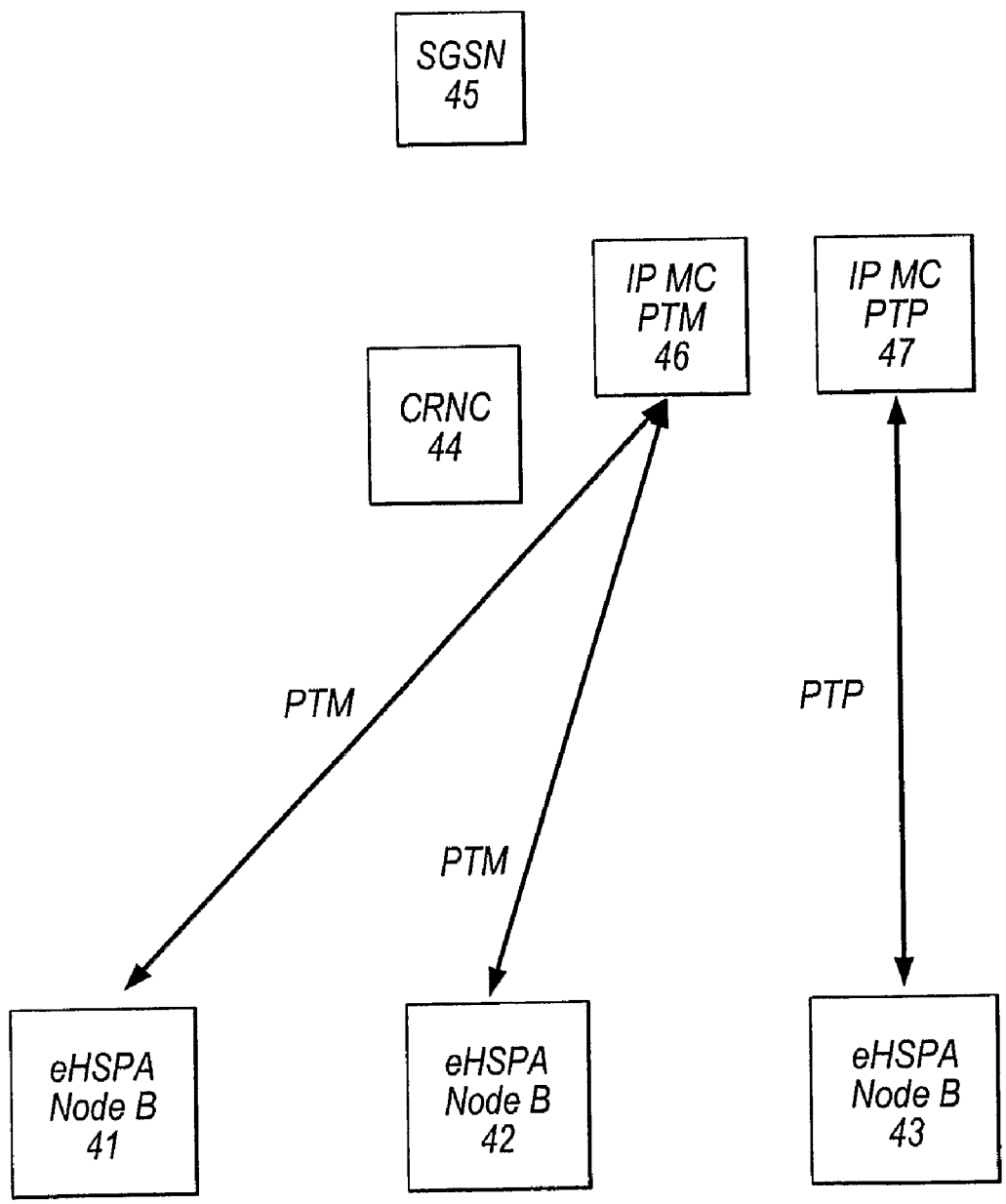
FIG. 5 illustrates an example of a PTM user plane setup directly to IP multicast.

This is illustrated generally in FIG. 5. With reference to FIG. 4, the CRNC 44 provided eHSPA Node Bs 41 and 42 with an IP address for PTM, and eHSPA Node B 43 with an IP address for PTP. In FIG. 5, the eHSPA Node Bs 41 and 42 have established their user planes with the PTM IP multicasting address 46, and eHSPA Node B 43 has established its user plane with the PTP IP multicasting address 47. The use of IP multicast and joining of the IP multicast group only after deciding whether point-to-point or point-to-multipoint is used may serve to minimise the duplication of data streams that would otherwise be required to each SRNC of the eHSPA Node Bs. The data stream is only split into multiples during the final stage of the user plane configuration procedure. In a variation of this embodiment of the invention, rather than a news multicast service being provided, a news broadcast service is provided. This alternative follows a similar procedure to the one just described, only for a broadcast service, it is not necessary for the user terminals to subscribe to the service, nor is there a "joining" phase. However this alternative embodiment would use exactly the same procedures from a RAN perspective.

Figure 2:
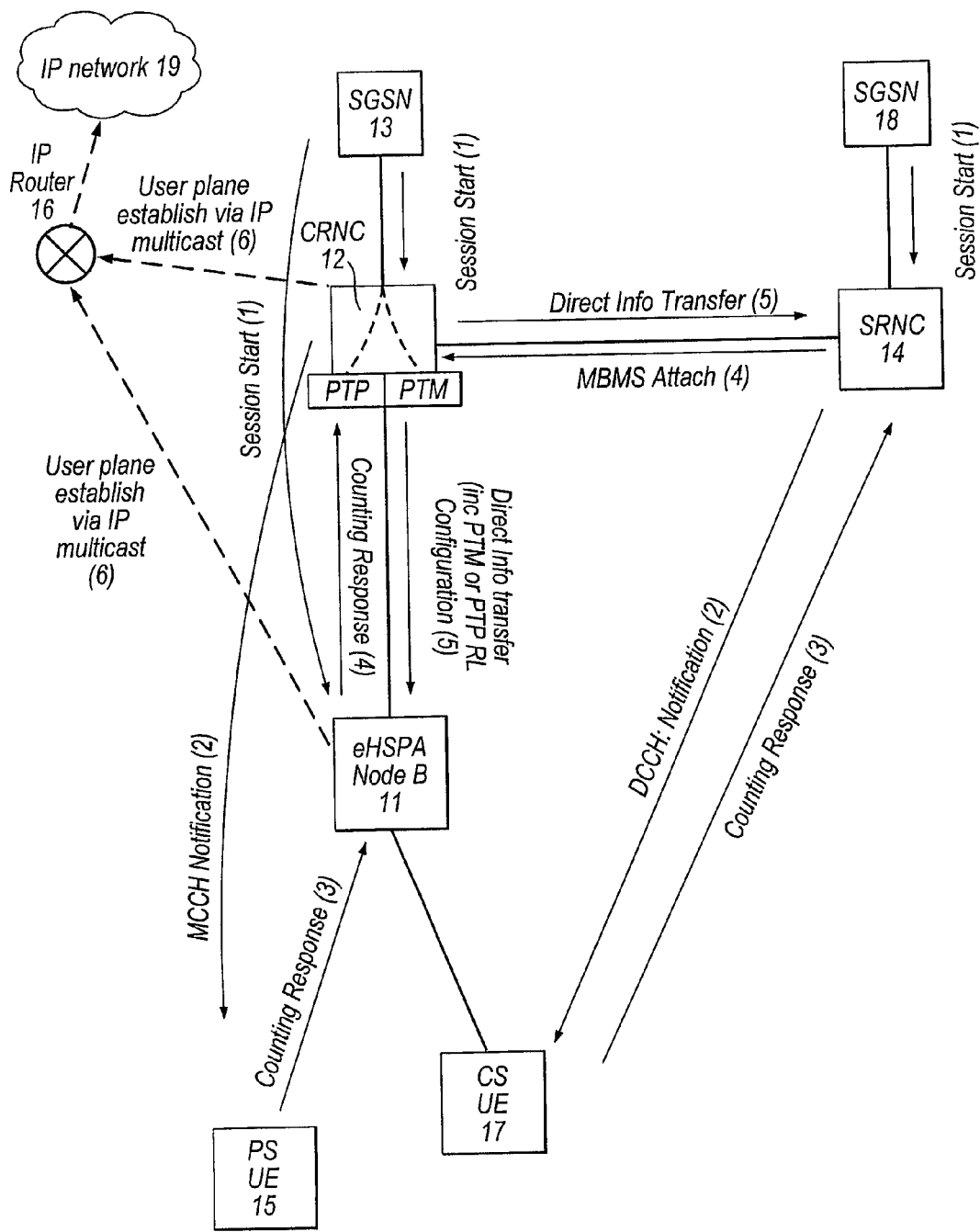
FIG. 2 illustrates an MBMS procedure according to a second embodiment of the invention.

An MBMS procedure according to a second embodiment of the invention is shown in FIG. 2. This procedure uses an SGSN-based IP multicast to provide data streams to the legacy CRNC and eHSPA Node Bs directly. The network arrangement for this second embodiment is the same as that shown in FIG. 1, so corresponding reference signs will be used. The MBMS procedure of this embodiment of the invention will also be described in regard to the situation of the service provider offering a news multicast to its subscribers.

It is again to be appreciated that in order for a user terminal to be eligible to receive multicast services from an operator, the user terminal needs to first start a relationship with the operator by taking out a subscription.

When the service provider wishes to make the news multicast available to its subscribers, the BM-SC (not shown) may be configured to send a "Session Start" message to all of the nodes in the network.

More typically, however, the BM-SC sends a "Session Start" message to all of the GGSNs recorded in its list of downstream nodes for this bearer service. The GGSNs in turn send the "Session Start" message to all the SGSNs recorded in its list of downstream nodes, which in this instance includes SGSN 13 and SGSN 18. SGSN 13 in turn sends the "Session Start" message to all RNCs recorded in its list of downstream nodes, which includes the second RNC 12, which has the role as the Controlling RNC (CRNC), and the SRNC of the evolved Node B 11. SGSN 18 sends the "Session Start" message to SRNC 14 of the legacy UTRAN. "Session Start Response" messages should be returned by all RNCs/eHSPA Node Bs that receive the SESSION START message.

Again in this embodiment, it is not a desirable approach to establish a user plane between the SGSNs and each of the RNCs due to the large usage of resources that would be required. In a simplified approach, the user plane could be established between the SGSN 13 and the CRNC 12, as well as between the SGSN 18 and each of the legacy RNCs 14 that receive the "Session Start" message.

However, according to this embodiment of the invention, the user planes are to be established via IP multicast, and so the user plane will not actually be provided via the SGSN.

Instead, in this embodiment, the SGSN 13 transmits the "Session Start" message to CRNC 12 as well as the eHSPA Node B 11. The session start message to the eHSPA Node B includes the IP multicast address for the PTP multicast group, and the Session Start message for the CRNC includes the IP multicast address for the PTM multicast group (and can optionally include the address for the PTP multicast group).

Upon receiving the "Session Start" message, the CRNC 12 notifies user terminals in the vicinity that a news multicast is about to commence, by sending out an MBMS Service Notification. This MBMS Service Notification is sent via the MBMS Control Channel (MCCH), which is a logical channel used for sending notifications to the air interface. The MBMS Service Notification is usually termed an "MCCH Notification", and effectively notifies the user terminals that a multicast session is about to start, if they would like to receive it.

If a user terminal (UE) would like to receive the news multicast, the UE transmits a message indicating such. This message indicates the service of interest to the UE and can be an "RRC Connection Request" or a "Cell Update" message, and would be received by the nearest Node B, or the Node B to which a connection is already established. Referring to FIG. 2, in the case of user terminal 15, a PS connection has already been established with the eHSPA Node B 11, and so it is the eHSPA Node B which receives the UE's request for the service. This stage in the procedure is generally called the "Counting" phase.

From the perspective of a standard UTRAN in FIG. 2, UE 17 sends its service request via a UTRAN Node B (not shown) to SRNC 14, with which a voice connection is already established. The UTRAN SRNC 14 would then indicate the UE interest to the Controlling RNC (CRNC) 12 such that it may then make a decision on PTM or PTP based on counting the total number of "UE interest" indications that it receives.

According to the present embodiment of the invention, when the eHSPA Node B 11 receives the service requests, it passes the messages to its internal RNC, which becomes the SRNC for the news multicast that is about to commence. The evolved Node B's SRNC then proceeds to count the number of responses. In this way, usage of network resources is minimised, as there is no need to forward the service requests to the external CRNC 12 for counting. In other words, the efficiency of the procedure is optimised by dividing away this counting functionality from the tasks performed by the CRNC 12.

Once the number of users has been counted by the eHSPA node B 11, it communicates this information to the CRNC 12 in an NBAP message across the Iub interface. The CRNC will also receive a corresponding message from SRNC 14, in the form of an "MBMS Attach" message. This "MBMS Attach" message communicates the number of users SRNC 14 has counted as being interested in the service in its cell.

Figure 12:
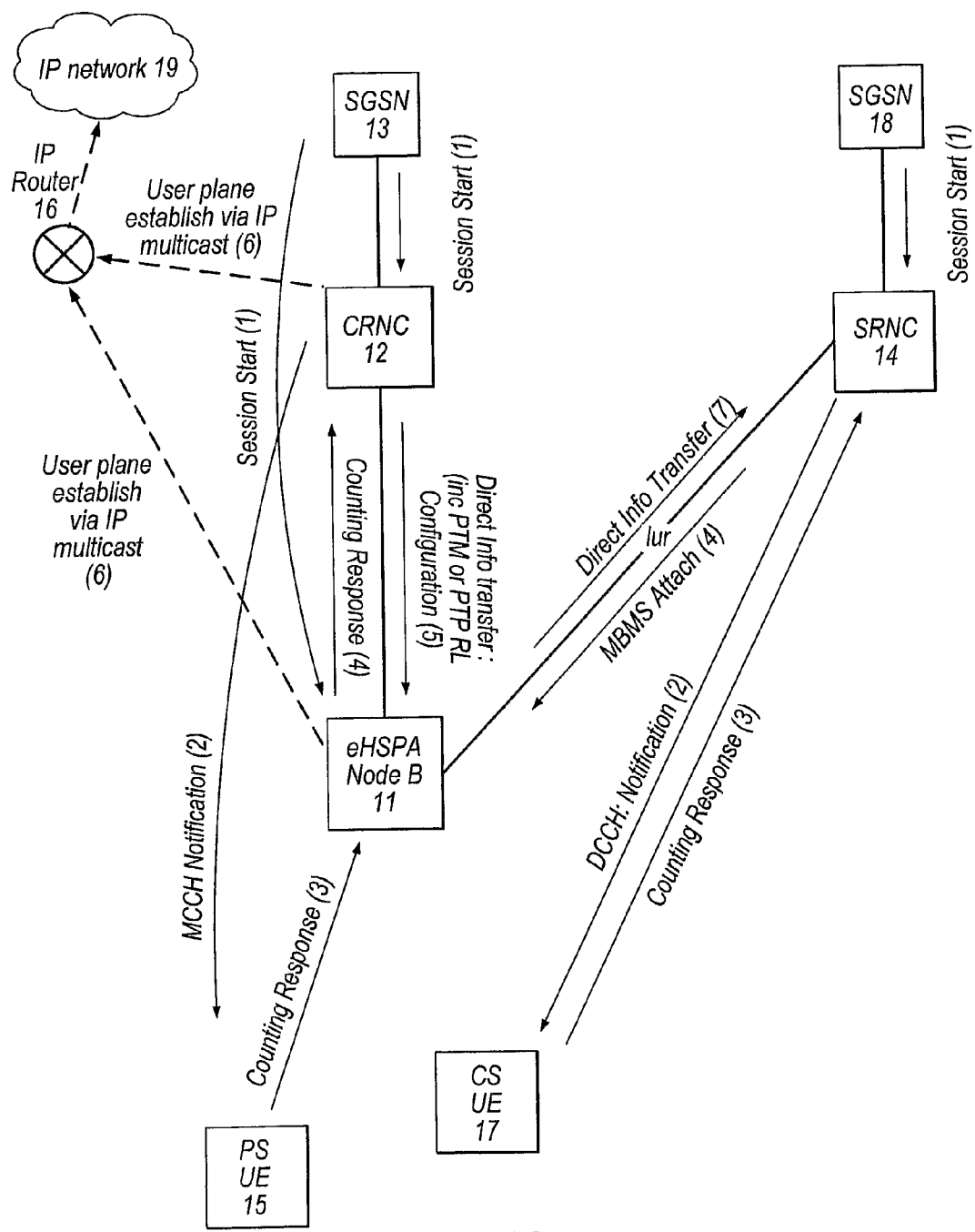
FIG. 12 illustrates an MBMS procedure according to a still further embodiment of the invention.

In an alternative, which is shown in FIG. 12, a direct connection exists between UTRAN SRNC 14 and eHSPA Node B 11, and so the UTRAN SRNC 14 instead indicates the UE interest to the eHSPA Node B 11, rather than directly to the CRNC 12. This UE interest will be communicated via an MBMS Attach message. In this alternative, the eHSPA Node B will then generate a common "counting response" for the CRNC 12.

When CRNC 12 has received the count from all of its associated SRNCs and eHSPA Node Bs, it processes this information and establishes the network resources needed for the multicast data transfer to take place. This is generally established based upon the number of UEs that wish to take part in the multicast and their locations.

Therefore, based upon the number of interested user terminals per Node B, the CRNC makes a decision as to whether a common channel can be used for all UEs in a cell taking part in the multicast (i.e PTM), or whether a separate channel for each UE is required (i.e. PTP).

With this decision made, the CRNC 12 will then provide a "Direct Information Transfer" message to the each SRNC and eHSPA Node B that has responded. In the case of the FIG. 12 embodiment, where legacy SRNCs have a direct connection to the eHSPA node B, this message will be relayed from the eHSPA Node B 11 to the connected legacy SRNC 14.

This "Direct Information Transfer" message provides the channel type information (i.e. PTP or PTM), and in the case of PTM, the frequency layer on which the service will be transmitted. Also in this message there may be an "IP Multicast Address", corresponding to the address that will be delivering the service. Alternatively, this address may be provided by the SGSN, such as in the Session Start message. This multicast address will depend on whether the CRNC has selected PTP or PTM and may be a multicast service from the core network itself (i.e. from the BM-SC/SGSN) or an IP network.

Upon receiving this "Direct Information Transfer" message, where PTP is chosen, as with the FIGS. 1 and 11 embodiments, the eHSPA Node B 11 will contact its nearest IP router 16 to request to join the relevant PTP multicast service, using the IP PTP Multicast Address provided by the SGSN 13 in the Session Start message. If PTM is chosen for one or more cells, the CRNC may either:
A) request to join the IP multicast service by contacting the nearest IP router 16, hence establishing the PTM user plane. This user plane will then be setup from the CRNC towards the eHSPA Node B 11. Where the connection is PTM and is to be provided by the CRNC 12, the CRNC will send any data down the Iub, and the eHSPA Node B 11 will act as a legacy Node B and transmit the PTM data over the S-CCPCH.
B) On receiving the indication that PTM is required, the eHSPA Node B joins the PTM IP Multicast group and retrieves the PTM data stream from the IP multicast server.

Where PTP is chosen for eHSPA Node B 11, the user plane transmission will start towards the eHSPA Node B directly via the eHSPA Node B joining the IP multicast group indicated in the Session Start message.

In this case, the SRNC functionality of the eHSPA Node B takes charge, and may subsequently provide the PTP data over the High Speed Downlink Shared Channel (HS-DSCH). It is to be appreciated that an alternative to this embodiment would be to also provide the PTP data stream to the eHSPA Node Bs via the CRNC over the Iub interface. However, this alternative may require a translation function, as the already encapsulated PDCP/RLC/MAC-m packets may need to be re-packed into PDCP/RLC/MAC-d packets by the SRNC for use on the DCH/HS-DSCH. This may be a complex procedure.

In an alternative to this embodiment, after the counting phase, when the eHSPA Node B has received information about the number of users requiring the service, the SRNC functionality of the eHSPA Node Bs can be moved to the existing CRNC via an SRNS Relocation. This alternative is less preferred, however, particularly for event-driven services, as this could unduly place a large load on the SGSN, particularly if all PS active users in the RNC coverage area requiring the service were relocated at the same time.

In a further alternative to the embodiments just described, the CRNC may also establish the user plane using the IP multicast address for a PTP service and relay the user plane to the eNode B. This is less preferred, however, as it requires additional signalling, compared to the eNode B establishing the user plane itself directed with the PTP IP multicast address.

It is to be appreciated that the exact order of the signalling steps in the embodiments so far described may be altered as necessary. For instance, the SGSN can send its service notification to the user terminals at the same time as, or before communicating the "Session Start" to each of the RNCs. When this occurs, the evolved Node B's can also check with each of its Direct Channel (DCH) users as to which are interested in the multicast/broadcast service about to commence. Further, for a multicast service, the evolved Node B's can also check with other RRC connected users with no additional signalling.

A further embodiment of the invention will now be described in relation to an LTE network. In this embodiment of the invention, a controller is introduced to manage the locations and nodes for the distribution of data. This controller comprises a Multicast Controller 61, typically a controlling Mobility Management Entity (MME), and a Controlling Multicast User Plane Entity (UPE) 62 combination. This controller 61/62 which is provided in addition to the standard MME/UPEs of the LTE network. The controlling MME 61 is preferably co-located with the Controlling Multicast UPE 62 but they may be physically separate nodes. The Controlling MME 61 has responsibility for control plane issues, such as the authorisation of Tracking Areas for UEs, while the Controlling UPE 62 has responsibility for user plane issues, and performs packet routing and forwarding.

This arrangement with a controlling UPE/MME overcomes the difficulties of a flexed network, where all the network nodes (e.g. the MME, UPE and SGSN), are interconnected to RAN nodes (e.g. the eNode Bs). The controlling MME/UPE is intended to correlate the service area and the superset of Tracking Areas in order to ensure efficient signalling and data distribution in the network. In this regard, as will be more apparent from the examples described below, by using a single controlling UPE to establish the user plane between the Multicast IP address and the applicable eNode Bs, optimisation of the transmission links is achieved by virtue of reduced "daisy-chaining" that would normally occur when each standard UPE is used to provide the user plane.

Figure 6:
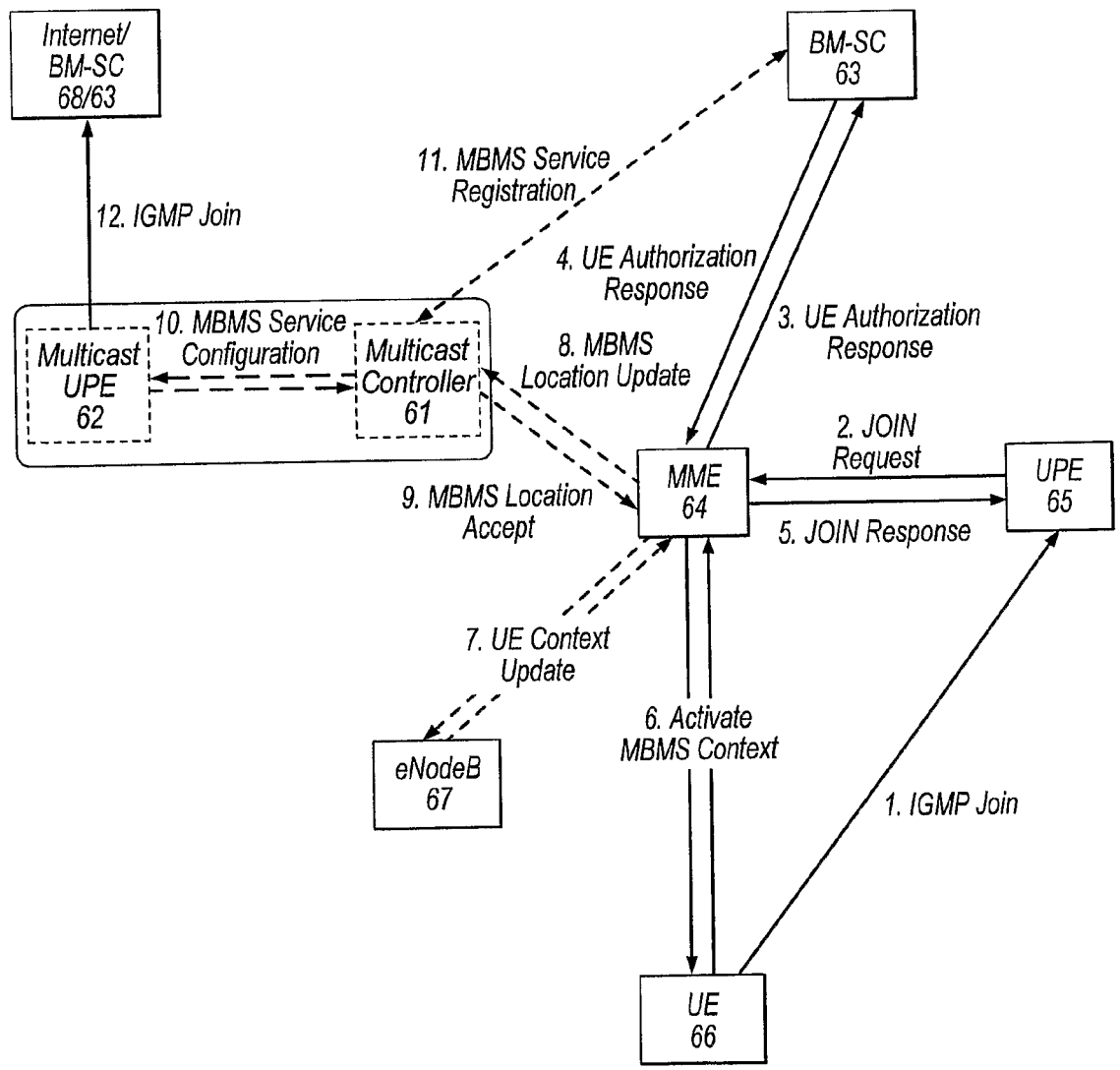
FIG. 6 illustrates an example of an MBMS/IP multicast registration procedure in an LTE network according to an embodiment of the invention.

Firstly referring to FIG. 6, an example of an IP Multicast Registration procedure is provided for the LTE network according to an embodiment of the invention. This network includes the Multicast Controller 61 and the controlling Multicast UPE 62, which are in communicable relation to the BM-SC 63 and a plurality of standard MMEs 64 and UPEs 65, although only one such combination is shown in FIG. 6.

Where a UE 66 wishes to register for a MBMS service, the UE transmits a Join message, which typically corresponding to the Internet Group Multicast Protocol (IGMP) and includes the IP multicast address of the requested service. This IGMP multicast Join message is intercepted by the nearest UPE 65 from the bearer, preferably being a P2P bearer. This allows the grouping of services which would traditionally have been provided by P2P transmission, and ensures that the distribution of off-network IP Multicast services (e.g. from the Internet) are completed in an efficient manner.

A P2P network uses Peercast, which is open source software that allows streaming media to be multicast.

The UPE 65 receiving the Join message then requests its associated MME 64 to setup the multicast service, where the multicast service is identified from the IP Multicast Address transmitted by the UE 66. In this regard, the MME 64 transmits a UE Authorisation Request to the BM-SC 63 in order to determine if the UE is authorised to receive the requested multicast service. The BM-SC 63 will send a reply to the MME 64, which either rejects the UE 66, or, if the UE is authorised to receive the multicast service, indicates the manner in which the service should be provided (i.e. PTP or PTM). Where a PTM service is to be provided to the UE 66, the BM-SC 63 provides the MME 64 with the TMGI (Temporary Mobile Group Identity) allocated to the multicast bearer service, as well as the address of the Multicast Controller which is to be used for the service. The MME stores this information in its UE context.

The MME 64 will then inform the Requesting UPE 65 how to proceed with the IGMP Join Request. For instance, where the UE has been rejected, the MME will indicate to the requesting UPE that the service should not be provided to the UE, and the UPE will reject the IGMP Join. Where a PTP multicast service is to be provided to the UE, the MME 64 will indicate to the requesting UPE 65 that the UPE should directly serve the IP multicast service to the UE. In this situation, no Core Network optimisation need be performed. The UE will then be registered to receive the requested multicast service via a PTP connection when it comes available, if it is not already available.

Where a PTM multicast service is to be provided to the UE, the MME 64 will provide the UE 66 with the MBMS Context, which includes the TMGI of the Multicast Bearer Service. The MME will also update the UE context stored in the eNode B 67 that is serving the UE, so that it includes the TMGI. The UE will then be registered to receive the requested multicast service via a PTM connection when it comes available, if it is not already available.

If the UE 66 moves out of its current Tracking Area/Routing Area to one which the MME 64 does not control, then the MME 64 will send an MBMS Location Update message to the MME Multicast Controller 61. The Multicast Controller 61 will acknowledge the MME 64 with an MBMS Location Update Accept message. The Controlling MME/UPE 61/62 will then provide the PTM MBMS service to the new Tracking Area/Routing Area, or request an MME/UPE within the new. Tracking Area/Routing Area to provide the PTM multicast service.

Similarly, if the MME 64 detects a UE in the current Tracking Area/Routing Area which it does not control, which also requires the multicast service (identified by TMGI and IP Multicast address), the MME will request, via the MBMS Location Update message, that the Controlling MME/UPE 61/62 provide the MBMS service to the Tracking Area/Routing Area.

Where this is the first request for the multicast service that the Multicast Controller 61 has received, the Multicast Controller will contact the Controlling UPE 62 to request that it join the Multicast Service. The Controlling UPE 62 then joins the Multicast Service, which could be hosted on the internet, or the BM/SC 63.

If the requested multicast service is hosted by the BM/SC 63 in a network, the Multicast Controller 61 will contact the BM-SC 63 requesting that the Multicast Controller be notified of starting sessions, and of the Quality of Service (QoS) requirements of the multicast service.

Figure 7:
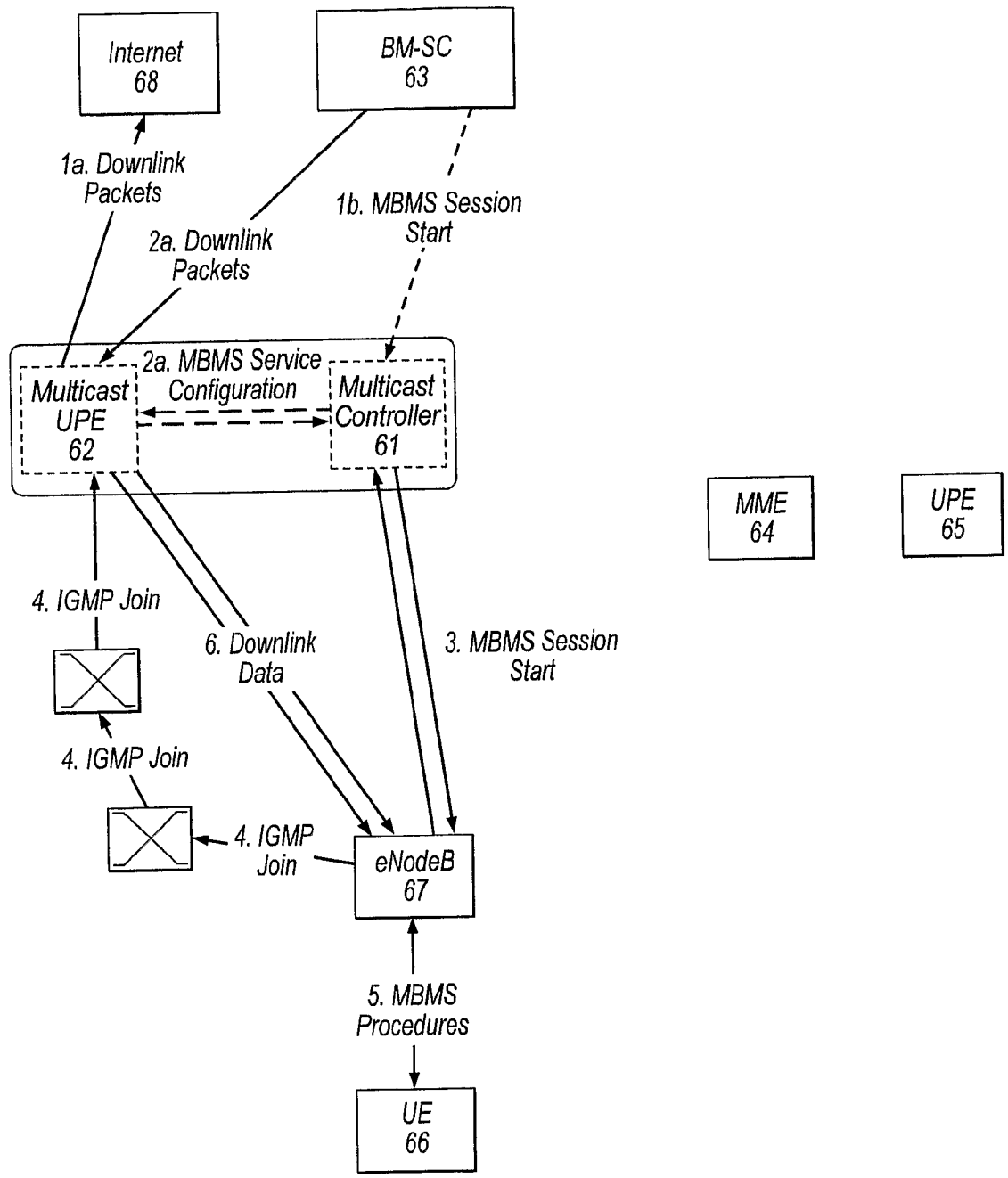
FIG. 7 illustrates an example of a Multicast Session Start procedure in an LTE network according to an embodiment of the invention.

The Multicast Session Start procedure for the LTE network according to an embodiment of the invention will now be described in relation to FIG. 7, where UE 66 is to receive the multicast session.

When the multicast session is ready to be delivered, the Multicast Controller 61 will be contacted by either the BM-SC 63 or the Controlling Multicast UPE 62. In this regard, when it is an internet IP multicast service, the service is triggered by the reception of downlink packets from the IP multicast address 68 to the Multicast UPE 62. When it is an operator controlled MBMS multicast service, the service is triggered by the BM-SC 63 transmitting the MBMS Session Start Request message.

For the internet IP multicast service example, when the Multicast UPE 62 receives the packets from the IP multicast service to which is has joined, the Multicast UPE informs the Multicast Controller 61 by sending an MBMS Session Start message. For an operator controlled MBMS multicast service, it is the BM-SC 63 that informs the Multicast Controller 61 that the MBMS Service is imminent.

Once the Multicast Controller 61 has been notified of the imminent multicast service, the Multicast Controller provides the Multicast UPE 62 with the Private IP Multicast address that should be used for the distribution of the multicast service between the Multicast UPE 62 and the eNode B 67.

The Multicast Controller 61 also informs each of the eNode Bs controlling cells in the Tracking Area currently containing UEs interested in the service, by sending the MBMS Session Start message to those eNode Bs. As an example, the Multicast Controller 61 provides eNode B 67 with the MBMS Session Start message. This message preferably includes the TMGI, the private IP Multicast address, as well as additional MBMS service specific and session specific information.

The eNode B 67 then initiates the IGMP joining procedure for the private IP multicast address with the Multicast UPE 62. The eNode B 67 also triggers the LTE MBMS procedures towards the appropriate UEs, such as 66. For any UEs in the Active State, where their UE context is stored at the eNode B which includes the TMGI of the multicast service (e.g. where the UE has subscribed to that multicast service), then the eNode B may inform the UE of the impending multicast in a dedicated fashion.

The Multicast UPE 62 will form the user plane from the private IP Multicast address to the eNode Bs 67 which have joined the private multicast distribution tree, so that the downlink data for the multicast service can be distributed. The multicast session will then be provided to the applicable Ues 66 via the established user plane until a Session Stop procedure is performed.

Figure 8:
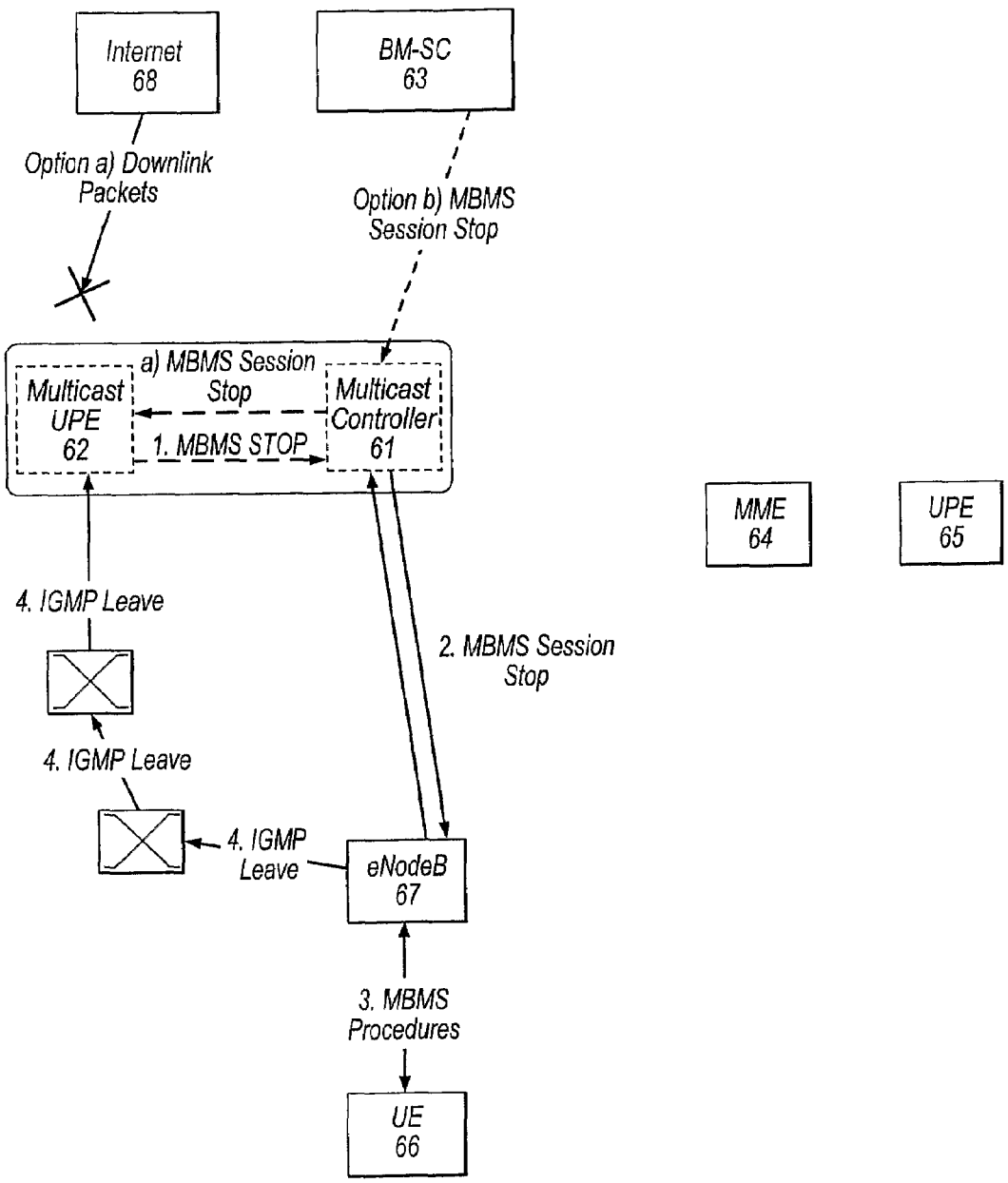
FIG. 8 illustrates an example of a Multicast Session Stop procedure in an LTE network according to an embodiment of the invention.

FIG. 8 illustrates an example of a Session Stop procedure according to an embodiment of the invention. The session stop procedure, like the session start procedure, has two options for the triggering process.

Where the multicast service is configured for Internet-based or "off-net" IP Multicast services, the Multicast UPE 62 is responsible for informing the Multicast Controller 61 when the data has stopped for some time.

Alternatively, when the MBMS service was started by signalling from the BM-SC 63 (i.e. for "on-net" services), it is the responsibility of the BM-SC to inform the Multicast Controller 61, via an MBMS Session Stop message, when the session is concluded. The Multicast Controller 61 will then instruct the Multicast UPE 62 to stop the transmission of any data for this service.

Once the Multicast Controller 61 has been informed of the cessation of services, the Multicast Controller will inform the appropriate eNode Bs 67 in its downstream list that the MBMS/multicast session has terminated, and that the eNode Bs can release the resources for this service. The eNode Bs 67 therefore trigger an LTE MBMS Session Stop procedure towards the applicable UEs, such as UE 66. The eNode Bs 67 also trigger the deactivation of the private IP Multicast bearer structure/user plane established via the Multicast UPE 62 through the transmission of an "IGMP leave" message.

Figure 9:
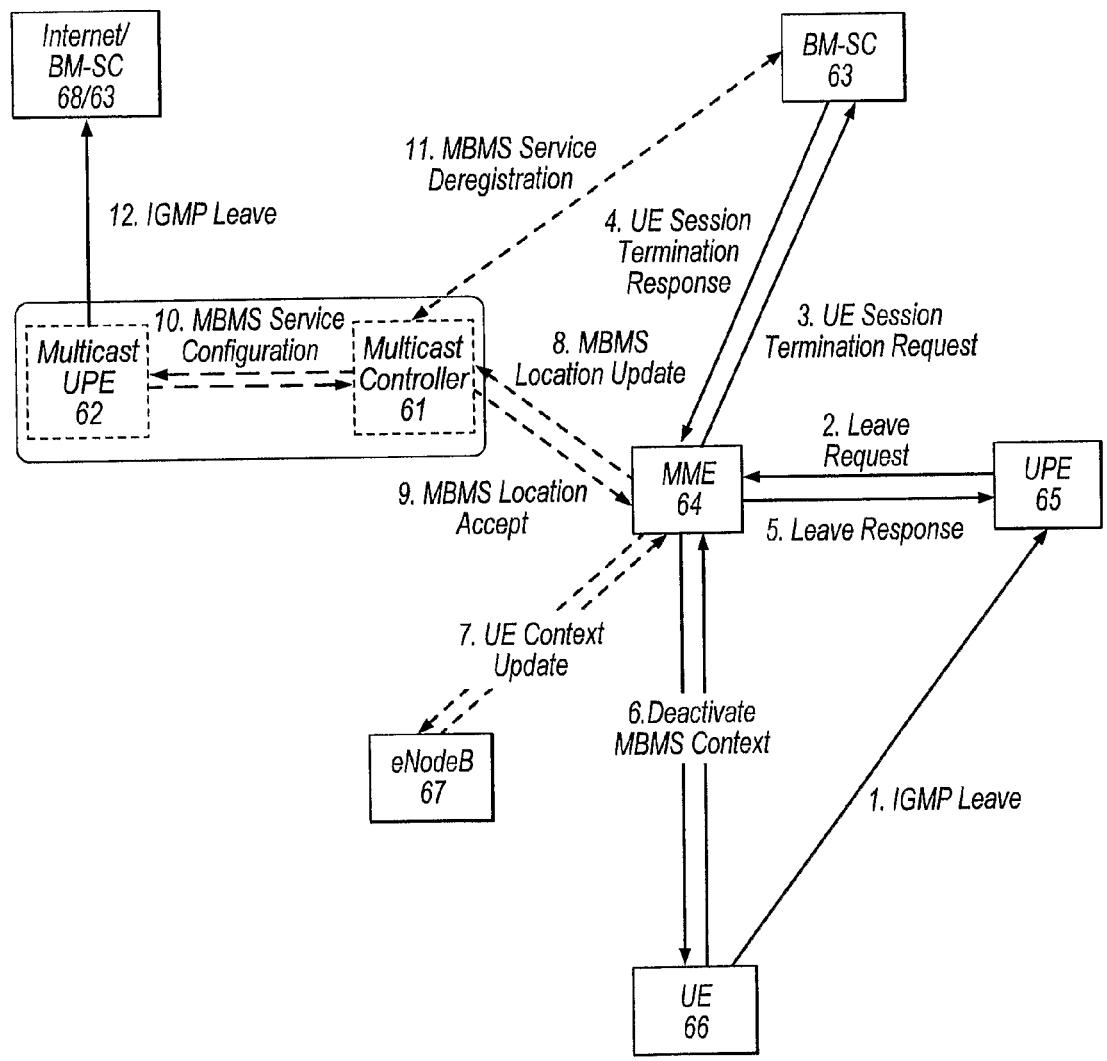
FIG. 9 illustrates an MBMS Multicast De-Registration procedure in an LTE network according to an embodiment of the invention.

De-registration of a UE from an MBMS multicast service is another aspect of this invention, and is illustrated in relation to FIG. 9. The process to deregister a UE is essentially the reverse process of the registration.

In this regard, the UE 66 would transmit an "IGMP leave" request, which is intercepted by the nearest UPE 65. The UPE notifies its associated MME 64 of the leave request, which in turn informs the BM-SC 63 when the UE 66 no longer requires the service, via a "UE Session Termination Request" message. The BM-SC 63 then removes the appropriate TMGI for the multicast service from the applicable UE context and sends an acknowledgement response. The MME 64 then sends an acknowledgement response to the UPE 65. The MME 64 also initiates a TMGI de-allocation from the UE context stored at the eNode B 67 and the UE 66 via "UE Context Update" and "Deactivate MBMS Context" messages respectively.

If the MME 64 no longer controls any UEs requiring this MBMS service in a specific Tracking Area/Routing Area, the MME will inform the Multicast Controller 61 via an "MBMS Location Update" message. The Multicast Controller 61 will then remove the MME 64 from its list of MMEs that will be notified when the service commences. This therefore serves to reduce unnecessary signalling when initiating a multicast session.

Further, when the last Tracking Area/Routing Area is removed from the Multicast Controller's list for that service, the Multicast Controller 61 will deregister itself from the service by sending an "MBMS Service Deregistration" to the BM-SC 63. The BM-SC 63 will then remove the Multicast Controller 61 from its list of nodes that are to receive the Session Start message for the service. Similarly the Multicast Controller 61 notifies the Multicast UPE 62 that it is leaving the service, and the Multicast UPE 62 in turn sends an IGMP leave message to the BM-SC 63 or internet host 68 of the service.

Figure 10:
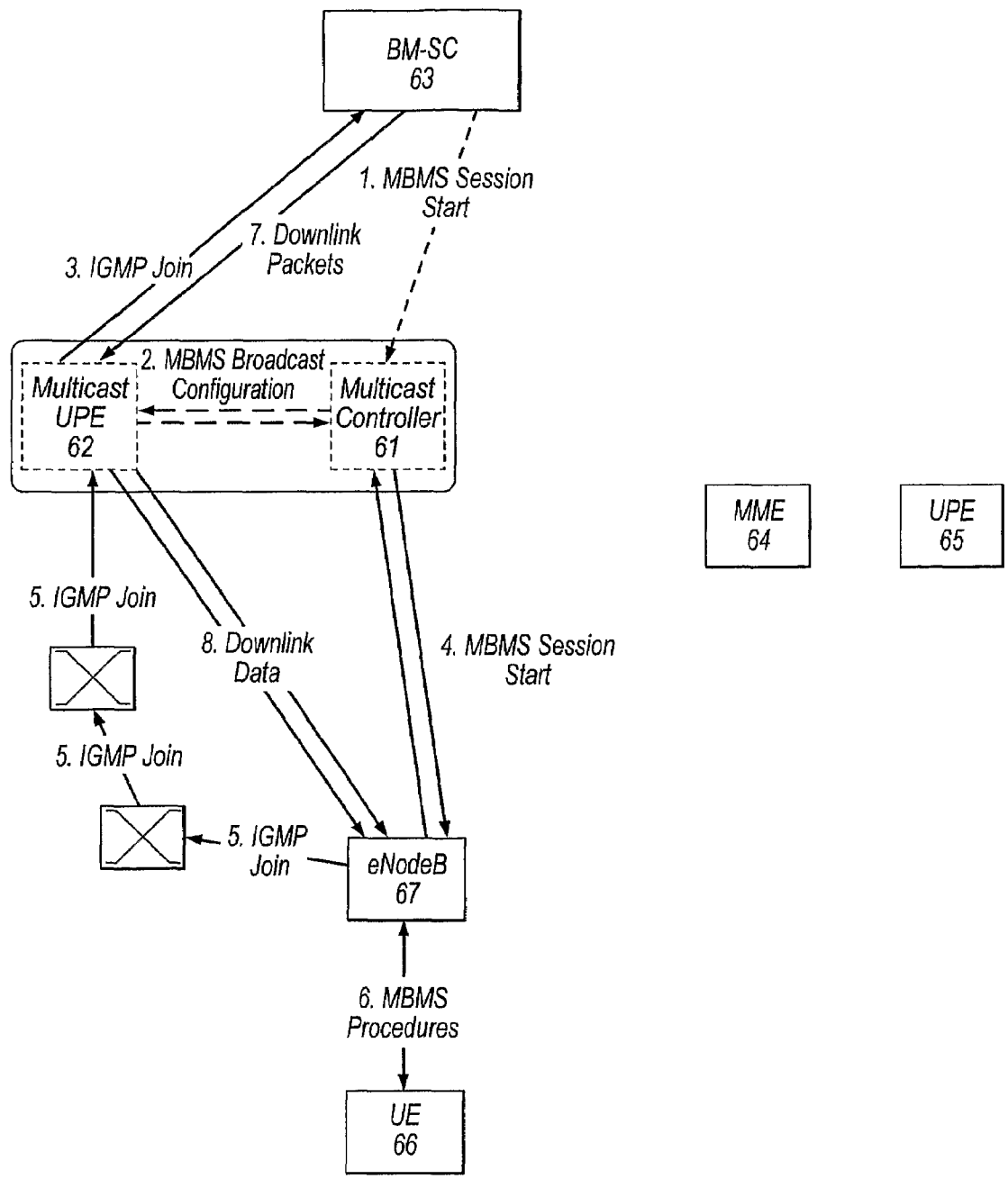
FIG. 10 illustrates a Broadcast Session Start procedure in an LTE network according to an embodiment of the invention.

Another embodiment of the present invention, as applied to an LTE network is shown in FIG. 10. This embodiment illustrates the session start procedure according to a broadcast service, rather than a multicast service, which was illustrated in relation to FIG. 7. Broadcast services differ from multicast services, in that pre-registration for the service is not required.

The broadcast service is therefore initiated by the BM-SC 63 transmitting an MBMS Session Start message to the Multicast Controller 61, informing it that an MBMS broadcast service is imminent. The broadcast service is identified by its unique TMGI.

The Multicast Controller 61 then instructs the Multicast UPE 62 to join the service, by providing it with the MBMS Broadcast configuration message. This configuration message contained the Private IP Multicast address that should be used for the distribution of the service between the Multicast UPE 62 and the eNode Bs 67. The Multicast UPE 62 joins the service, which is hosted by the BM-SC 63 in this example, by sending an IGMP Join message to the BM-SC.

The Multicast Controller 61 in turn sends the MBMS Session Start message to each of the eNode Bs 67 controlling cells in the service area of the broadcast service. This message preferably includes the TMGI of the broadcast service, the private IP Multicast Address, as well as additional MBMS service and session specific information.

The eNode Bs 67 then initiate the IGMP joining procedure with the Multicast UPE 62, for the private IP Multicast Address. The eNode Bs 67 also triggers the LTE MBMS procedures towards the UEs 66.

Once the Multicast UPE 62 has joined the broadcast provided the BM-SC 63, downlink data for the service is able to start to flow from the BM-SC to the Multicast UPE 62. The Multicast UPE will in turn distribute the downlink data for the service to the eNode Bs 67 which have joined the private IP MBMS distribution tree.

It is to be appreciated that for all the embodiments of the invention that have been described, additional signalling steps are likely to be required in order to fully effect the multicast service. For instance, each participating UE may require further multicast information, such as a decryption key, as well as information on the allocated PTM/PTP configuration. These additional steps have not been described herein as they are not necessary for the understanding of the inventive concept.

Further, in the multicast embodiments of the invention, while it is preferred that the user terminals that make use of this service have an established relationship with the service provider, this is not an essential component of the invention. The established relationship provides a mechanism for the service provider to charge for their services, but can easily be not included in the embodiments of the invention, particularly if the service is to be provided free of charge.

Further, it is also possible in all embodiments where IP multicast content is provided to UEs, that this content is tunnelled through another IP multicast connection, such as an already existing connection.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of establishing a Multimedia Broadcast Multicast Service (MBMS) communication in a telecommunications network, the telecommunications network including an enhanced node B having a first radio network controller (RNC), the enhanced node B configured to communicate with user terminals, the telecommunications network further including a second RNC configured to communicate with the enhanced node B and also to communicate with a core network component, the method comprising:

establishing an IP Multicast connection according to at least one of the following features:

(i) between an IP server and the enhanced Node B in order to provide the MBMS communication, wherein, for each connection established, an associated user plane extends between the IP server and one or more of the user terminals via the enhanced Node B and not via the core network component; or (ii) between the IP server and the second RNC in order to provide the MBMS communication, wherein, for each connection established, an associated user plane extends between the IP server and one or more user terminals via the second RNC and not via the core network component.

2. The method of claim 1, wherein the IP Multicast connection is established with the address of an IP network.

3. The method of claim 1, wherein IP multicast content is tunnelled through another IP multicast connection.

4. A telecommunications network configured to perform the method according to claim 1.

5. A method of establishing a Multimedia Broadcast Multicast Service (MBMS) communication in a telecommunications network, the telecommunications network including an enhanced node B having a first radio network controller (RNC), the enhanced node B configured to communicate with user terminals, the telecommunications network further including a second RNC configured to communicate with the enhanced node B and also to communicate with a core network, the method comprising:

establishing an IP Multicast connection directly between an IP address and at least one of the enhanced Node B and the second RNC in order to provide the MBMS communication; and the second RNC determining whether the enhanced Node B is to provide the MBMS communication via a Point-to-Point (PTP) connection or via a Point-to-Multipoint (PTM) connection.

6. The method of claim 5 wherein the first RNC only provides the direct IP Muliticast connection where the IP Multicast connection is to be provided as a PTP connection.

7. The method of claim 6 wherein the second RNC provides the IP Multicast connection to the enhanced Node B where the IP Multicast connection is to be provided as a PTM connection.

8. The method of claim 5 wherein the first RNC provides the direct IP multicast connection for both the PTP connection and the PTM connection.

9. The method of claim 5, wherein a first IP address is used for the PTM connection, and a second IP address is used for the PTP connection.

10. The method of claim 5, wherein the same IP address is used for both point-to-point (PTP) connection and the point-to-multipoint (PTM) connection.

11. The method of claim 10 wherein the first RNC uses the IP address only if a point-to-point connection is required.

12. The method of claim 5 wherein the second RNC notifies the enhanced Node B of the determination and provides the enhanced Node B with an appropriate IP address for establishing the direct IP Multicast connection.

13. A method of establishing a Multimedia Broadcast Multicast Service (MBMS) communication in a telecommunications network, the telecommunications network including an enhanced node B having a first radio network controller (RNC), the enhanced node B configured to communicate with user terminals, the telecommunications network further including a second RNC configured to communicate with the enhanced node B and also to communicate with a core network, the method comprising:

establishing an IP Multicast connection directly between an IP address and at least one of the enhanced Node B and the second RNC in order to provide the MBMS communication, wherein the first RNC counts the number of responses from user terminals interested in receiving the MBMS communication and communicates the result to the second RNC.

14. A method of establishing a Multimedia Broadcast Multicast Service (MBMS) communication in a telecommunications network, the telecommunications network including an enhanced node B having a first radio network controller (RNC), the enhanced node B configured to communicate with user terminals, the telecommunications network further including a second RNC configured to communicate with the enhanced node B, the method comprising:

the first RNC performing a first portion of the RNC functionality for establishing the MBMS communication; and the second RNC performing a second portion of the RNC functionality for establishing the MBMS communication.

15. The method of claim 14, wherein the first portion of the RNC functionality includes establishing an IP Multicast connection directly between the enhanced Node B and an IP address.

16. The method of claim 14, wherein the second portion of the RNC functionality includes determining whether the enhanced Node B is to provide the MBMS communication via a PTP connection or a PTM connection, and notifying the enhanced Node B of that determination.

17. A method of establishing a Multimedia Broadcast Multicast Service (MBMS) communication in a telecommunications network, the telecommunications network including an enhanced node B having a first radio network controller (RNC), the enhanced node B configured to communicate with user terminals, the telecommunications network further including a second RNC configured to communicate with the enhanced node B and also to communicate with a core network, the method comprising:

establishing an IP Multicast connection directly between an IP address and at least one of the enhanced Node B and the second RNC in order to provide the MBMS communication;

the second RNC receiving information on the number of interested user terminals from one or more UTRAN RNCs;

determining whether the one or more user terminals associated with each UTRAN RNC is to receive the MBMS communication by a point-to-point connection or a point-to-multipoint connection; and notifying each UTRAN RNC of its decision and providing each with an appropriate IP address to source the MBMS communication.

18. A method of establishing a Multimedia Broadcast Multicast Service (MBMS) communication in a telecommunications network, the telecommunications network including an enhanced node B having a first radio network controller (RNC), the enhanced node B configured to communicate with user terminals, the telecommunications network further including a second RNC configured to communicate with the enhanced node B and also to communicate with a core network, the method comprising:

establishing an IP Multicast connection directly between an IP address and at least one of the enhanced Node B and the second RNC in order to provide the MBMS communication;

the first RNC receiving information on the number of interested user terminals from one or more directly connected UTRAN RNCs and including this within count information sent to the second RNC; and the first RNC notifying each UTRAN RNC of the PTM or PTP decision from the second RNC and providing each with an appropriate IP address to source the MBMS communication.

19. A telecommunications network, comprising:

an enhanced node B having a first radio network controller (RNC) in communicable relation to a second RNC, being a controlling RNC, wherein the telecommunications network includes at least one of the following configurations:

the enhanced node B is configured to establish an IP Multicast connection directly between the enhanced Node B and an IP address in order to provide a Multimedia Broadcast Multicast Service (MBMS) communication to one or more user terminals; and the second RNC is configured to establish an IP Multicast connection directly between the second RNC and an IP address and relay the connection to the enhanced Node B in order to provide an MBMS communication to one or more user terminals.

20. The network of claim 19 wherein the enhanced Node B is an eHSPA Node B.

21. The network of claim 19, wherein the network is a UTRAN network.

22. The network of claim 19, wherein the network is an LTE network.

23. The network of claim 19, wherein the network establishes an IP Multicast connection directly between an IP address and at least one of the enhanced Node B and the second RNC in order to provide the MEMS communication.

24. A mobile telecommunications network, comprising:
a central IP multicast controller;
a plurality of telecommunications devices registered with the mobile telecommunications network;
an associating device configured to associate a plurality of said devices in a group; and
a routing device configured to route multicast data to the group of devices via said central IP multicast controller, wherein said group of devices all receive the multicast data via a base station, and wherein the base station comprises the Radio Access Network of the mobile telecommunications network.

25. The network of claim 24, wherein the network comprises an LTE network.

* * * * *